(12) United States Patent
Kim et al.

(10) Patent No.: US 12,739,098 B2
(45) Date of Patent: Sep. 15, 2026

(54) METHOD AND APPARATUS FOR PROVIDING CREDENTIAL SERVICE RELATED TO CLOUD SERVICE

(71) Applicant: SAMSUNG SDS CO., LTD., Seoul (KR)

(72) Inventors: Hyun Woo Kim, Seoul (KR); Dong Min Jang, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 49 days.

(21) Appl. No.: 18/677,312

(22) Filed: May 29, 2024

(65) Prior Publication Data

US 2024/0405972 A1 Dec. 5, 2024

(30) Foreign Application Priority Data

May 31, 2023 (KR) ........................ 10-2023-0069723

(51) Int. Cl.

| | |
|---|---|
| ***H04L 29/06*** | (2006.01) |
| ***G06F 21/00*** | (2013.01) |
| ***H04L 9/08*** | (2006.01) |
| ***H04L 9/32*** | (2006.01) |

(52) U.S. Cl.

CPC .......... *H04L 9/0819* (2013.01); *H04L 9/3228* (2013.01)

(58) Field of Classification Search

None

See application file for complete search history.

(56) References Cited

U.S. PATENT DOCUMENTS

| | | | | |
|---|---|---|---|---|
| 9,497,184 | B2 | 11/2016 | Fork et al. | |
| 10,164,902 | B2 | 12/2018 | Son et al. | |
| 10,841,093 | B2 | 11/2020 | Li et al. | |
| 2011/0138190 | A1* | 6/2011 | Chase | H04L 9/0656 713/189 |
| 2015/0188927 | A1 | 7/2015 | Santhi et al. | |

(Continued)

FOREIGN PATENT DOCUMENTS

| | | |
|---|---|---|
| CN | 114254289 A | 3/2022 |
| KR | 10-2502167 B1 | 2/2023 |

(Continued)

OTHER PUBLICATIONS

Communication dated Jul. 1, 2024, issued by the European Patent Office in counterpart European Application No. 24178402.4.

*Primary Examiner* — Lisa C Lewis

(74) *Attorney, Agent, or Firm* — Sughrue Mion, PLLC

(57) ABSTRACT

A method for providing a credential service may include transmitting, to a user terminal, data of a request page including a cloud service selection field for selecting one cloud service from a list of a plurality of cloud services; receiving, from the user terminal, a request for issuing a temporary key for a credential for calling an API served by a second cloud service selected in the cloud service selection field; transmitting an account issuance request signal to a system of the second cloud service in response to the receiving the request for issuing the temporary key; receiving credential key information for a first account issued to an institution, from the system of the second cloud service in response to the transmitting the account issuance request signal; and transferring the credential key information to the user terminal in response to the request for issuing the temporary key.

10 Claims, 12 Drawing Sheets

(56) References Cited

U.S. PATENT DOCUMENTS

| | | | | |
|---|---|---|---|---|
| 2017/0244864 | A1* | 8/2017 | Ishino | H04N 1/4433 |
| 2018/0063111 | A1* | 3/2018 | Vasudevan | H04W 12/06 |
| 2020/0044847 | A1 | 2/2020 | Li et al. | |
| 2020/0380109 | A1* | 12/2020 | Bendersky | G06F 21/46 |
| 2023/0004660 | A1* | 1/2023 | Kim | H04L 9/3213 |
| 2023/0145488 | A1 | 5/2023 | Grinstein et al. | |

FOREIGN PATENT DOCUMENTS

| | | | |
|---|---|---|---|
| KR | 10-2023-0035260 | A | 3/2023 |
| WO | 2022/011055 | A2 | 1/2022 |

* cited by examiner

METHOD AND APPARATUS FOR PROVIDING CREDENTIAL SERVICE RELATED TO CLOUD SERVICE

CROSS-REFERENCE TO RELATED APPLICATION

This application claims priority from Korean Patent Application No. 10-2023-0069723 filed on May 31, 2023 in the Korean Intellectual Property Office and all the benefits accruing therefrom under 35 U.S.C. 119, the contents of which in its entirety are herein incorporated by reference.

BACKGROUND

1. Technical Field

The present disclosure relates to a method and an apparatus for providing credential service related to a cloud service, and more particularly, to a method and an apparatus for providing a credential service that should be preceded to call an application programming interface (API) provided as a part of a cloud service.

2. Description of the Related Art

Cloud service providers provide various application programming interfaces (APIs) so that general-purpose element functions required for software development may be easily implemented only by call of the APIs. In order to call such APIs, a credential should be passed. Developers often include this credential key in a program source code. That is, it is often found that the credential key is included in the source code in the form of "hard coding."

When a credential key for API call is included in the source code, unintended errors or credential failures may be prevented from occurring during a credential process, but there is a possibility that a credential key issued for a specific user by a cloud service provider may be leaked. For example, a source code in which a credential key is hard-coded may be exposed to an unspecified number of people for contribution to an open source project.

Through a temporary credential that is only temporarily valid, it will be possible to prevent the leaked key from being continuously utilized. However, in order to utilize the API of each cloud service provider, obtaining a temporary credential of the cloud service provider will be another burden on the developer. That is, the developer will avoid a temporary credential due to this burden, and will still prefer to paste a permanent credential and its resulting credential key to the source code in the form of hard coding.

Therefore, it is required to provide a new service that can receive and process temporary credential applications for API calls from various cloud service providers.

SUMMARY

An object of the present disclosure is to provide a method and an apparatus for providing a credential service related to a cloud service, in which a corresponding cloud service issues a credential for other cloud service on behalf of a user.

Another object of the present disclosure is to provide a method and apparatus for providing a credential service related to a cloud service, in which the corresponding cloud service may provide a temporary credential for other cloud service for a period of time desired by a corresponding cloud service user when the user should use the other cloud service while using the corresponding cloud service.

Other object of the present disclosure is to provide a method and apparatus for providing a credential service related to a cloud service, in which roles of a module or system required in performing a credential may be efficiently distributed to prevent load of each module or system.

The objects of the present disclosure are not limited to those mentioned above and additional objects of the present disclosure, which are not mentioned herein, will be clearly understood by those skilled in the art from the following description of the present disclosure.

According to an aspect of an example embodiment of the disclosure, there is provided a method for providing a credential service related to a cloud service, performed by a computing system that provides a first cloud service, the method including: transmitting, to a user terminal, data of a request page including a cloud service selection field for selecting one cloud service from a list of a plurality of cloud services, the plurality of cloud services including a second cloud service and a third cloud service, which are distinguishable from the first cloud service; receiving, from the user terminal, a request for issuing a temporary key for a credential for calling an application programming interface (API) served by the second cloud service selected in the cloud service selection field; transmitting an account issuance request signal to a system of the second cloud service in response to the receiving the request for issuing the temporary key; receiving credential key information for a first account issued to an institution, which manages the computing system, from the system of the second cloud service in response to the transmitting the account issuance request signal; and transmitting the credential key information to the user terminal in response to the request for issuing the temporary key.

The request page may further include a field for receiving a valid period of the credential for the API call, and the transmitting the account issuance request signal may include transmitting the account issuance request signal requesting an issuance of a temporary account valid for a period corresponding to the valid period of the credential for the API call.

The transmitting the account issuance request signal requesting the issuance of the temporary account may include transmitting a temporary account issuance request signal based on the valid period input through the request page corresponding to a valid period of a temporary account supported by the second cloud service.

The request page may further include a field for receiving a valid period of the credential for the API call. The transmitting the account issuance request signal may include transmitting a permanent account issuance request signal based on the valid period input through the request page not corresponding to the valid period of a temporary account supported by the second cloud service. The method may further include transmitting an account deletion request signal to the system of the second cloud service based on an expiration of the valid period of the credential for the API call.

The request page may further include a field for receiving a valid period of the credential for the API call. The transmitting the account issuance request signal may include transmitting a permanent account issuance request signal, and the method may further include transmitting an account deletion request signal to the system of the second cloud service based on an expiration of the valid period of the credential for the API call.

According to an aspect of an example embodiment of the disclosure, there is provided a method for providing a credential service related to a cloud service, performed by a cloud service providing system, the cloud service providing system including an ID provider (IDP) module, an identity and access management (IAM) module, and a first system, the method including: receiving, by the cloud service providing system from a user terminal, an authentication token issuance request for authentication for the cloud service, the authentication token issuance request including an access key issued by the IAM module, an IDP token issued by the IDP module and valid period information of a temporary key; transmitting, by the first system, a verification request for the IDP token to the IDP module in response to the receiving the authentication token issuance request; receiving, by the first system, a verification result for the IDP token from the IDP module; based on the verification result being successful, issuing an authentication token and transmitting the issued authentication token to the user terminal; and matching and storing the access key, the valid period information, and the authentication token, which are included in the authentication token issuance request; receiving, by the first system from an application, a request for issuing a temporary key for a credential for calling an application programming interface (API) served by the cloud service, the request including the authentication token; and performing by the first system, a credential for the application by using the authentication token included in the request for issuing the temporary key; based on the credential passed, issuing a temporary key having a valid period corresponding to the valid period information stored in association with the authentication token; and transmitting the issued temporary key to the application.

According to an aspect of an example embodiment of the disclosure, there is provided a system for providing a credential service related to a cloud service, the system being configured to provide a first cloud service and including: one or more processors; and a memory configured to store instructions, wherein the one or more processors are configured to execute the instructions to perform: transmitting, to a user terminal, data of a request page including a cloud service selection field for selecting one cloud service from a list of a plurality of cloud services, the plurality of cloud services including a second cloud service and a third cloud service, which are distinguishable from the first cloud service; receiving, from the user terminal, a request for issuing a temporary key for a credential for calling an application programming interface (API) served by the second cloud service selected in the cloud service selection field; transmitting an account issuance request signal to a system of the second cloud service in response to the receiving the request for issuing the temporary key; receiving credential key information for a first account issued to an institution, which manages the system, from the system of the second cloud service in response to the transmitting the account issuance request signal; and transmitting the credential key information to the user terminal in response to the request for issuing the temporary key.

The request page may further include a field for receiving a valid period of the credential for the API call. The transmitting the account issuance request signal may include transmitting the account issuance request signal requesting an issuance of a temporary account valid for a period corresponding to the valid period of the credential for the API call.

The transmitting the account issuance request signal requesting the issuance of the temporary account may include transmitting a temporary account issuance request signal based on the valid period input through the request page corresponding to a valid period of a temporary account supported by the second cloud service.

The request page may further include a field for receiving a valid period of the credential for the API call. The transmitting the account issuance request signal may include transmitting a permanent account issuance request signal based on the valid period input through the request page not corresponding to a valid period of a temporary account supported by the second cloud service. The one or more processors may be configured to execute the instructions to further perform transmitting an account deletion request signal to the system of the second cloud service based on an expiration of the valid period of the credential for the API call.

The request page may further include a field for receiving a valid period of the credential for the API call. The transmitting the account issuance request signal may include transmitting a permanent account issuance request signal. The one or more processors may be configured to execute the instructions to further perform transmitting an account deletion request signal to the system of the second cloud service based on an expiration of the valid period of the credential for the API call.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Figure 1:
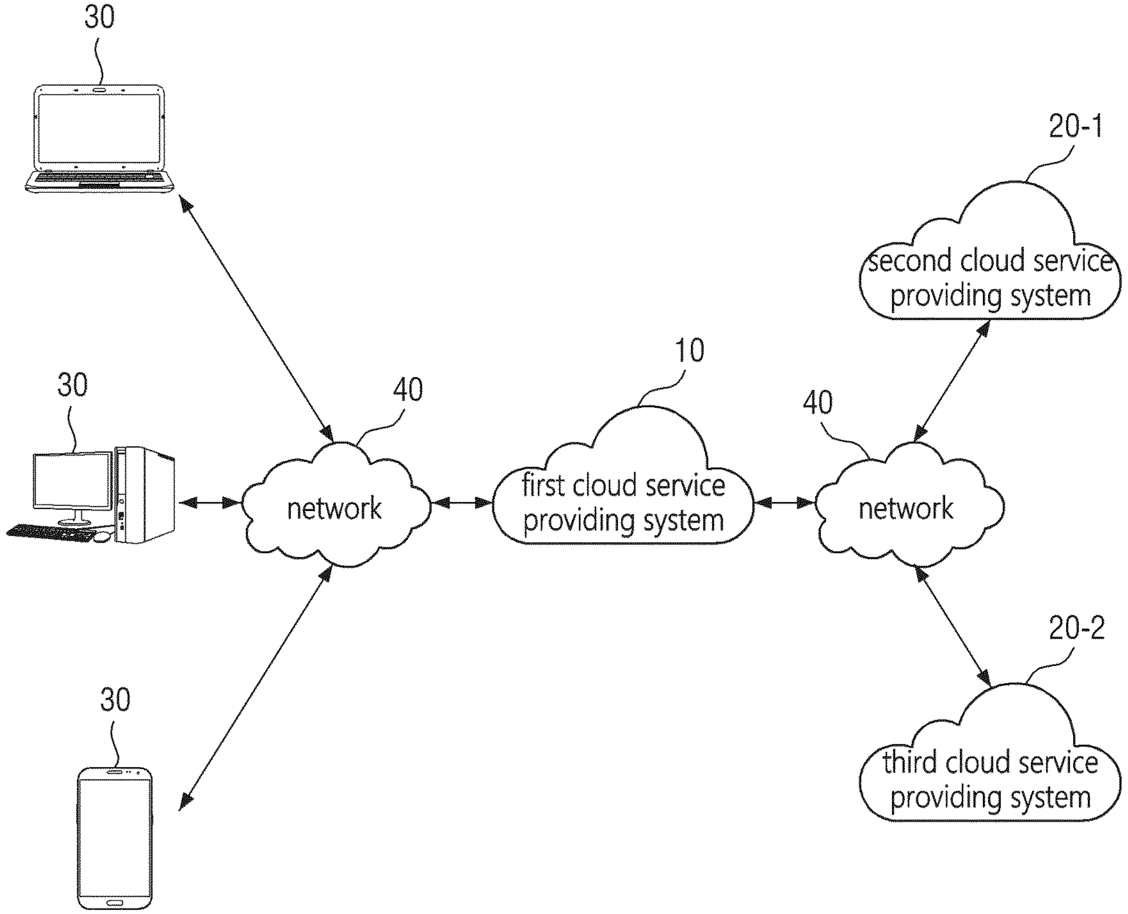
FIGS. 1 and 2 are schematic views illustrating a system for providing a credential service related to a cloud service according to one embodiment of the present disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, embodiments of the present disclosure will be described with reference to the attached drawings.

Hereinafter, a configuration and operation of a system for providing a credential service related to a cloud service according to one embodiment of the present disclosure will be described with reference to FIGS. 1 and 2. FIG. 1 is a schematic view illustrating a system for providing a credential service related to a cloud service. Hereinafter, the 'system for providing a credential service related to a cloud service' will be abbreviated as a service providing system.

Referring to FIG. 1, the service providing system according to the present embodiment may include a first cloud service providing system 10, a second cloud service providing system 20-1, a third cloud service providing system 20-2, a user terminal 30, and a network 40.

The first cloud service providing system 10 may receive a request for issuing a temporary key for a credential for calling an application programming interface (API) served by a cloud service from the user terminal 30. Hereinafter, for convenience of understanding, 'API served by a cloud service' will be abbreviated as 'cloud API'.

In this case, the issuance request may include selection information on any one of the second cloud service providing system 20-1 or the third cloud service providing system 20-2. Hereinafter, for assistance of understanding, the following description will be based on that the second cloud service providing system 20-1 is selected.

In response to the issuance request, the first cloud service providing system 10 may transmit an account issuance request signal to the system 20-1 of the second cloud service and receive credential key information on a first account issued to an institution that manages the first cloud service providing system 10 from the system 20-1 of the second cloud service. In addition, the first cloud service providing system 10 may transmit the credential key information to the user terminal 30 in response to the request for issuing the temporary key.

The first cloud service providing system 10 may be also understood as acting a request for issuing a temporary key of a user who wants to use API of the system 20-1 of the second cloud service. As described above, the system 20-1 of the second cloud service issues the first account to the institution that manages the first cloud service providing system 10, not the first account to the user. That is, the user may use the API provided by the system 20-1 of the second cloud service without subscribing to the system 20-1 of the second cloud service.

The service providing system according to the present embodiment may provide remarkable user convenience that allows APIs of various CSP providers to be used without a membership registration procedure for each CSP provider.

In addition, the service providing system according to the present embodiment may solve the problem of the above-described credential key hard coding to some extent by issuing a credential key required for API calls by various CSP providers in the form of a temporal key.

The first cloud service providing system 10 may be a system that provides a cloud service provider (CSP) service by itself as well as a service that issues a credential temporary key for the cloud API. Of course, in some embodiments, the first cloud service providing system 10 may be a system that performs only the issuance service of the temporary key and does not perform its own CSP service.

The second cloud service providing system 20-1 and the third cloud service providing system 20-2 refer to cloud service providing systems that are distinguished from the first cloud service providing system 10. For example, when the first cloud service providing system 10 is a system of a first service provider, the second cloud service providing system 20-1 may be a system of a second cloud service provider different from the first service provider, and the third cloud service providing system 20-2 may be a system of a third cloud service provider different from the first service provider.

The network 40 provides a wired/wireless communication means for data transmission between the first cloud service providing system 10 and the second cloud service providing system 20-1 or between the first cloud service providing system 10 and the user terminal 30. The network 40 may include a LAN, a wireless LAN, Wi-Fi, Bluetooth, 4G, 5G or other wired/wireless communication means. A detailed technical description of the network 400 is widely known in the art, and thus will be omitted herein.

In the present embodiment, the first cloud service providing system 10 requests issuance of a temporary key for a credential of an account in which a valid period is set only when the user needs to access the second cloud service providing system 20-1, and transmits it to the user. Therefore, according to the present embodiment, the need for hard coding in a source code or a configuration file disappears, thereby enhancing security and managing accounts for other cloud services within one cloud service.

It has been described that the cloud service providing system 10 of the service providing system according to the present embodiment may be a system that provides a CSP service by itself as well as a service for issuing a credential temporary key for API call. The cloud service providing system 10 may provide the service for issuing a credential temporary key for API call through a separate module rather than a main module related to the entire CSP service, such as an ID provider (IDP) module and an ID and access management (IAM) module. Therefore, the cloud service providing system 10 may minimize the impact of the service for issuing a credential temporary key for API call on the CSP service.

The above-described cloud service providing system 10 may include an ID provider (IDP) module, an identity and access management (IAM) module, and a first system.

The cloud service providing system 10 may receive an authentication token issuance request for authentication for the cloud service from a user terminal. The authentication token issuance request may include an access key issued by the IAM module, an IDP token issued by the IDP module, and valid period information of the temporary key.

In addition, the cloud service providing system 10 may transmit a verification request for the IDP token to the IDP module in response to the reception of the authentication token issuance request. The cloud service providing system 10 receives a verification result for the IDP token from the IDP module, and when the verification result is a verification success, the first system may issue an authentication token, transmit the issued authentication token to the user terminal, match and store the access key, the valid period information and the authentication token, which are included in the authentication token issuance request.

Next, the first system of the cloud service providing system 10 may receive, from an application, a request for issuing a credential temporary key for calling the API served by the cloud service. The request for issuing the temporary key may include the authentication token. In addition, the first system may perform a credential for the application by using the authentication token included in the request for issuing the temporary key. When the credential passes, the first system may issue a temporary key having a valid period according to the stored valid period information to correspond to the authentication token. The first system may transmit the issued temporary key to the application.

In some embodiments, the first system may be a security key management system (KMS). The first system may provide a service for easily creating and safely storing/managing an encryption key in order to safely protect important data of the application. The user encodes/decodes data by using the encryption key, and the encryption key may be stably managed in a hierarchically encrypted centralized encryption key method. In addition, the first system may enable data to be protected from cryptographic threats through key life cycle management.

The first system may be a system that provides a service introduced through "https://www.samsungsds.com/kr/security-key-management-service/security-key-management-service.html," for example.

The security key management system, not the core system that affects the overall CSP service while performing the key management function, performs credential and temporary key issuance operations, thereby maintaining the overall load balance of the system providing the CSP service and obtaining the effect of the optimal module performing the operations according to the embodiments of the present disclosure.

Figure 2:
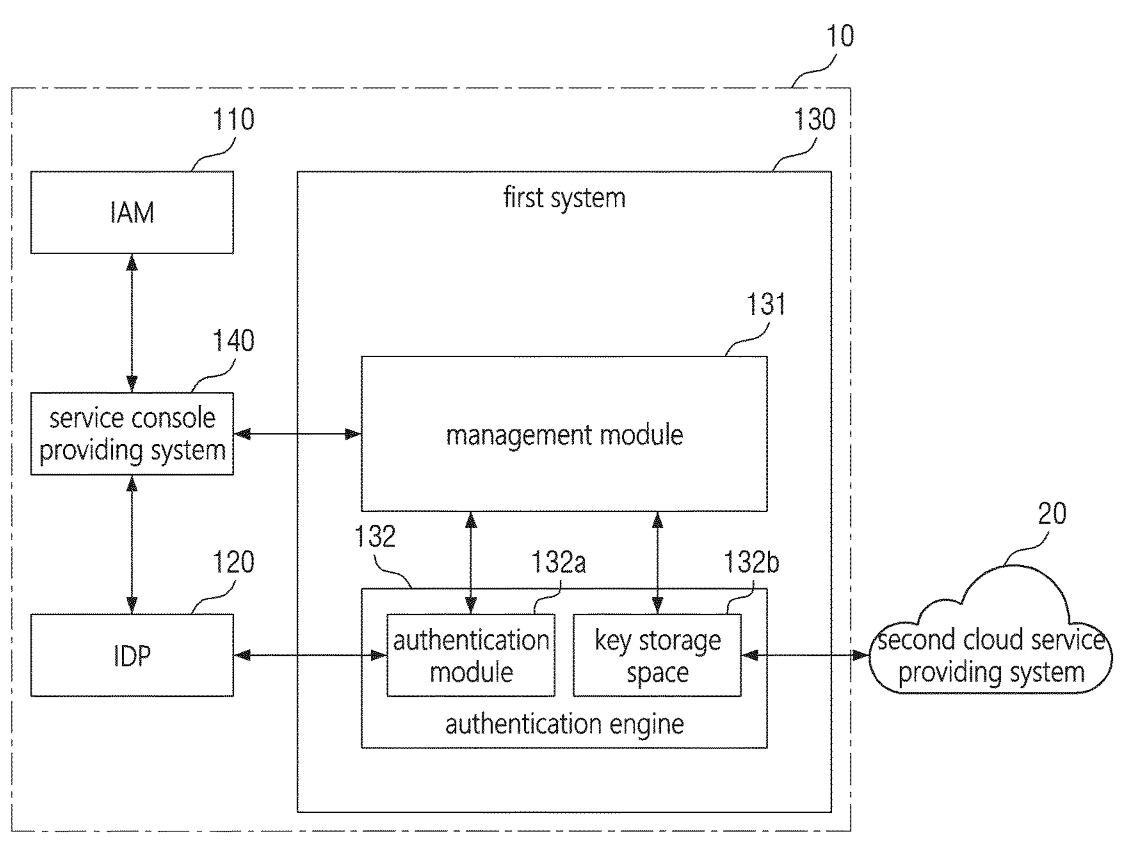

FIG. 2 is a view illustrating a detailed configuration of a system for providing a credential service related to a cloud service. Referring to FIG. 2, a relationship between modules or systems included in the first cloud service providing system 10 is illustrated. Detailed operations between modules or systems will be described later in FIG. 5, and hereinafter, roles of each module or system will be described.

An ID provider (IDP) (hereinafter referred to as 'IDP') module 120 provides a user authentication service that uses the first cloud service providing system 10 as a system for creating, storing and managing a user's ID.

A service console providing system 140 is middleware that executes an application driven on the first cloud service providing system 10 to perform necessary functions and transmits the executed result to a web server, and transmits a request for issuing a temporary key to the second cloud service providing system 20-1 from the user to a first system 130.

Since an Identity (ID) and Access Management (hereinafter, referred to as 'IAM') module 110 stores policies and each user's authority, which are registered in the first cloud service, the first cloud service providing system 10 may request the second cloud service providing system 20-1 to issue a temporary key in accordance with the policies and the authority, which are registered in the IAM module 110.

The first system 130 verifies the token including the user's account information issued by the IDP module 120 through an authentication module **132*a*, and when the verification is successfully performed, the first system 120 requests the second cloud service providing system 20-1 to issue credential information of the temporary key to access the second cloud service providing system 20-1, receives a temporary account in which a valid period is set, and transmits credential information on the issued temporary account to the user terminal 30**.

An operating method of the service providing system according to the present embodiment will be understood in more detail by referring to other embodiments that will be described later. In addition, although not specified separately, the technical spirits that may be understood through the above-described embodiments of the service providing system according to the present embodiment may be reflected in other embodiments that will be described later.

Hereinafter, a method for providing a credential service related to a cloud service according to another embodiment of the present disclosure will be described with reference to FIGS. 3 to 8. Hereinafter, for convenience of understanding, a 'method for providing a credential service related to a cloud service' will be abbreviated as a 'service providing method'. The service providing method according to the present embodiment may be performed by a computing device. Also, in the service providing method according to the present embodiment, some operations may be performed by a first computing device, and the other operations may be performed by a second computing device. For example, some operations of the service providing method according to the present embodiment may be performed by an on-premise physical server, and the other operations may be performed by a cloud compute instance. Hereinafter, when a subject to perform each operation is omitted, it will be understood that the subject is the computing system.

Figure 3:
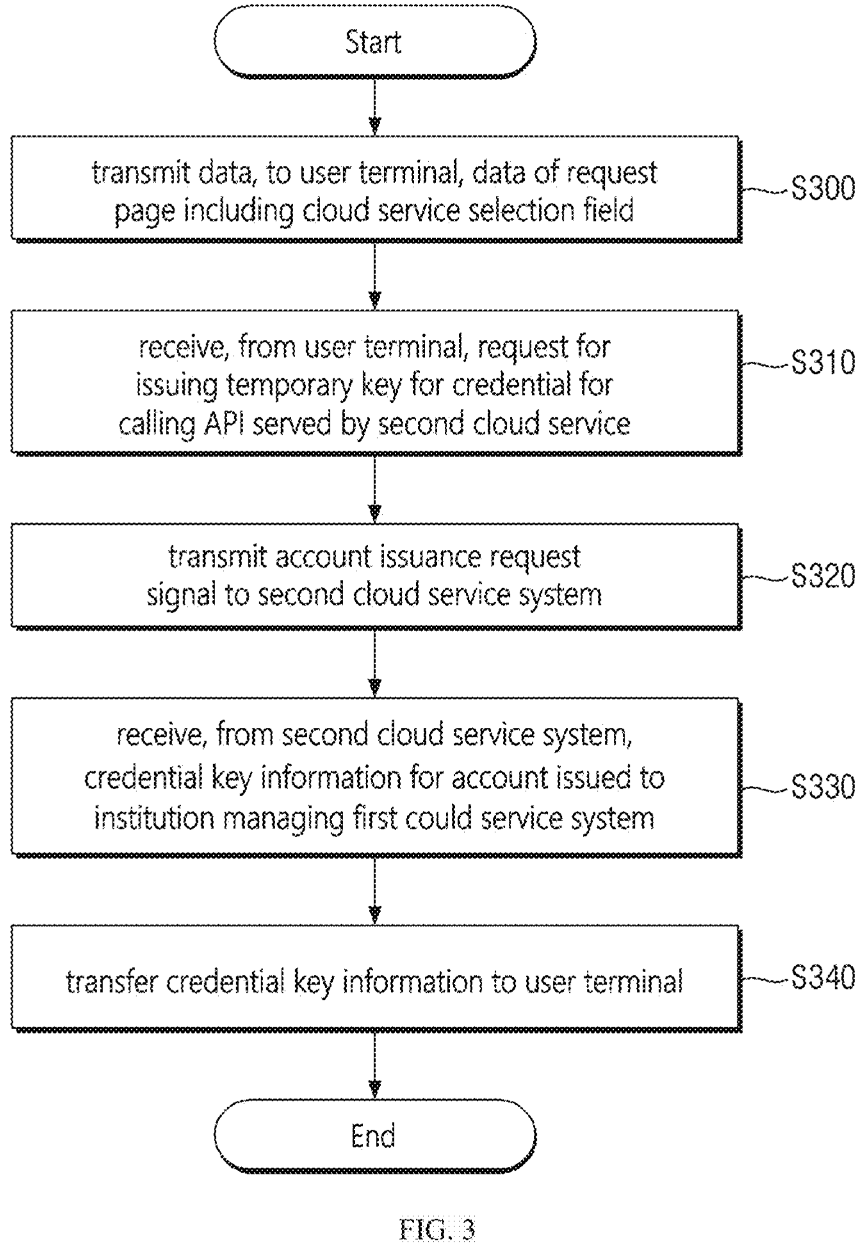
FIG. 3 is a flow chart illustrating a method for providing a credential service related to a cloud service according to another embodiment of the present disclosure.

The service providing method according to the present embodiment will be described with reference to FIG. 3.

Figure 4:
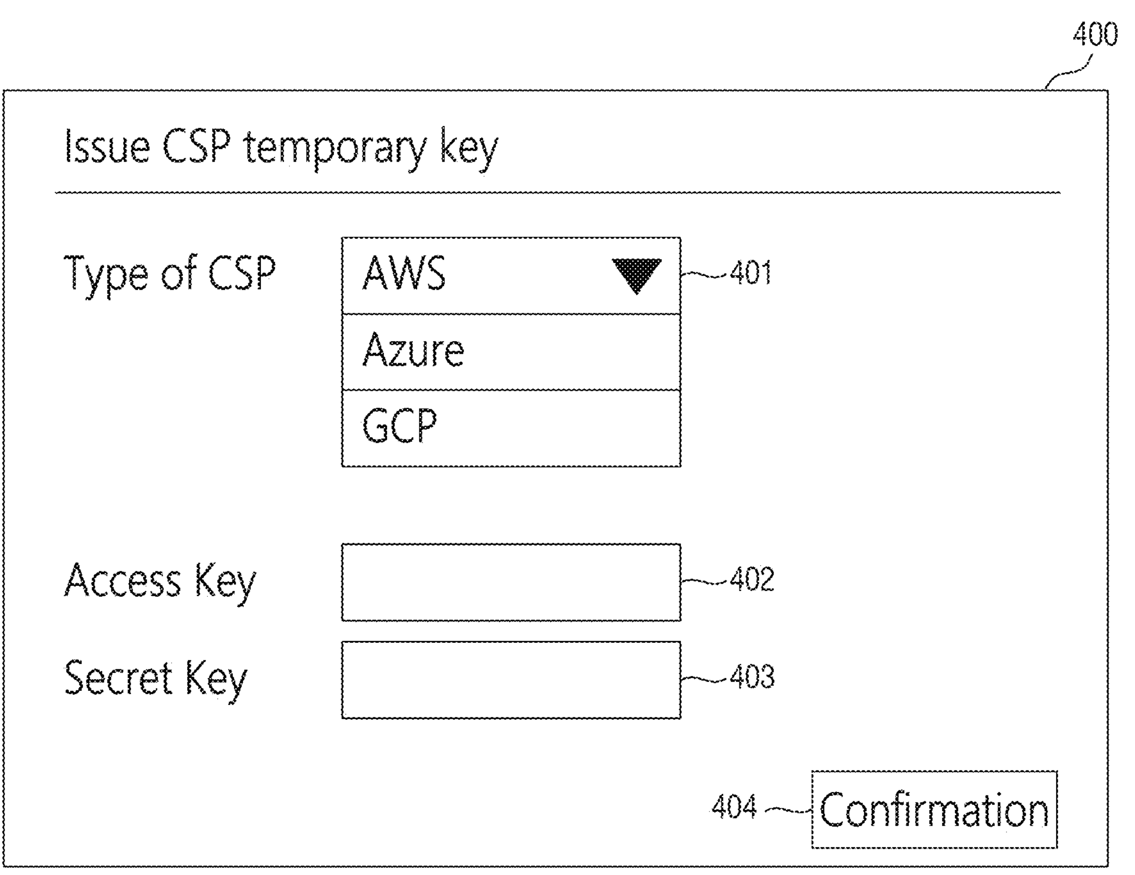
FIG. 4 is a view illustrating an exemplary temporary key issuance request page for a credential for calling an application programming interface (API), which may be displayed on a user terminal, in some embodiments of the present disclosure.

First, the computing system may transmit data of a request page, which includes a cloud service selection field, to the user terminal 30 so as to select one cloud service of a list of a plurality of cloud services including a second cloud service and a third cloud service (S300). Referring to FIG. 4, in the transmitted request page, the first cloud service providing system 10 may receive a type 401, an access key 402 and a secret key 403 of a cloud service provider (CSP) (hereinafter referred to as 'CSP') from the user through the service console providing system 140.

The type of the CSP may include any kind of cloud service including a second cloud service and a third cloud service, which are distinguished from the first cloud service. An access key and a secret key of an account having an authority for the second cloud service providing system 20-1, which are created in advance by the user, are input to an area to which the access key 402 and the secret key 403 are input. This is obvious to be distinguished from the credential information issued by the second cloud service providing system 20-1 for the temporary account.

Afterwards, when the user inputs information on the type, the access key and the secret key of the CSP and clicks a confirmation button 404, the first cloud service providing system 10 receives a request for issuing a credential temporary key for API call of the second cloud service from the user terminal 30 (S310).

Next, the first cloud service providing system 10 transmits an account issuance request signal to the second cloud service providing system 20-1 in response to the reception of the issuance request of the temporary key from the user terminal 30 (S320). In this case, the account subjected to the issuance request is distinguished from the account created in advance by the user, and refers to an account temporarily issued by the second cloud service providing system 20-1 with respect to the first cloud service providing system 10.

Before transmitting the account issuance request signal to the second cloud service providing system 20-1, the first cloud service providing system 10 transmits API for requesting temporary key issuance therein and performs user authentication that uses the first cloud service. This will be described later in detail with reference to FIG. 5.

Next, the first cloud service providing system 10 receives, from the second cloud service providing system 20-1, credential information on the temporary account issued to the institution, which manages the first cloud service providing system 10, in response to the transmission of the account issuance request signal (S330).

Finally, the first cloud service providing system 10 transmits credential information on the temporary account to the user terminal in response to the issuance request for the temporary key (S340).

Figure 5:
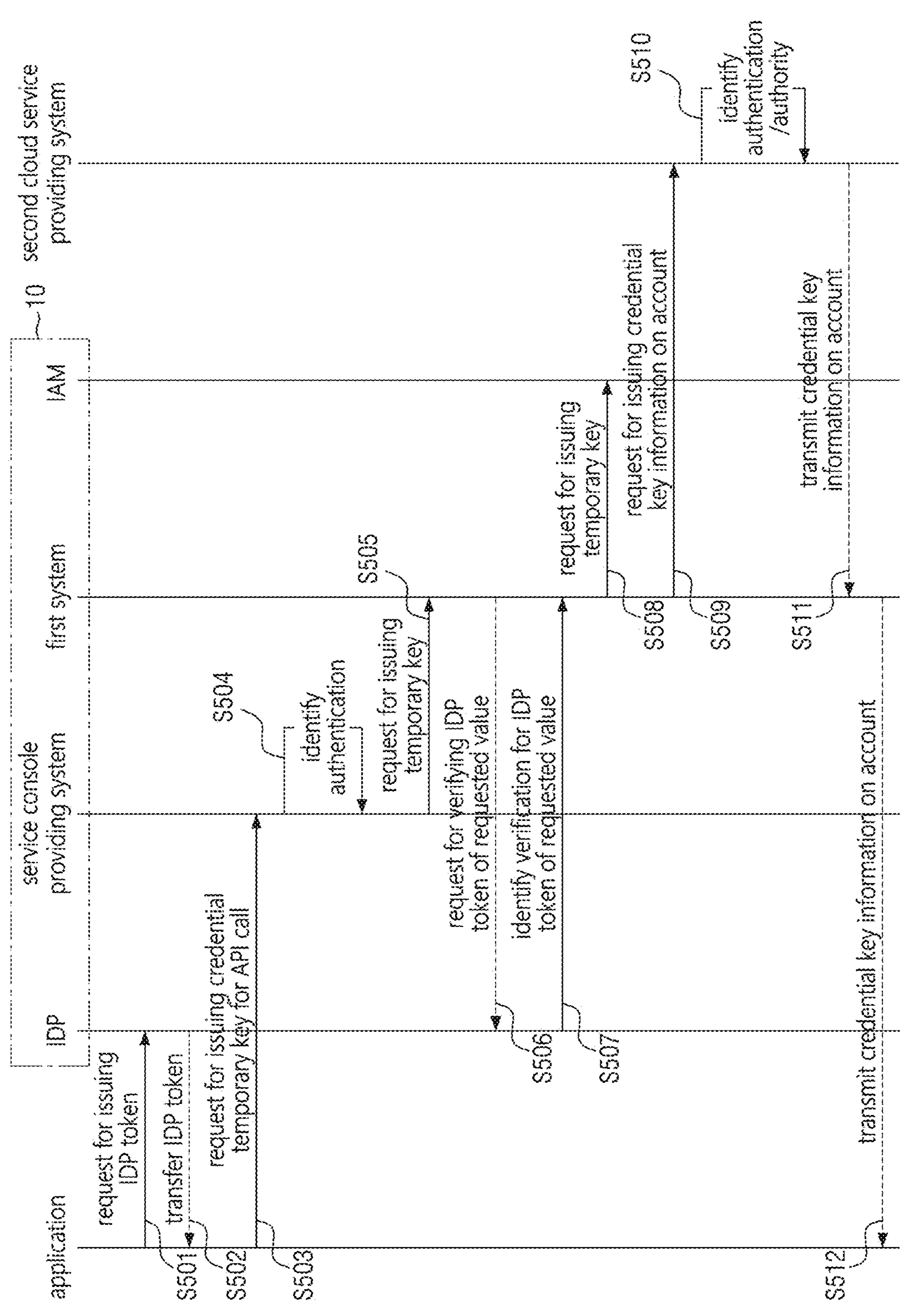
FIG. 5 is a signal flow chart illustrating a method for providing a credential service related to a cloud service, which is described with reference to FIG. 3.

Hereinafter, a method for providing a credential service related to a cloud service according to one embodiment of the present disclosure will be described with reference to FIG. 5. FIG. 5 is a signal flow chart illustrating the method for providing a credential service related to a cloud service, which is described with reference to FIG. 3.

Before performing a series of operations shown in FIG. 5, as a preliminary operation, an authority necessary for the second cloud service that the user wants to access through the first cloud service providing system 10 is specified to create an authorized account, and credential key information for a user's account for the second cloud service is set in the first system 130. The credential key information includes an access key and a secret key of an account, which are created by the first cloud service and may access the second cloud service. Hereinafter, the method for providing a credential service related to a cloud service will be described on the premise that the above preliminary operation is completed.

A process of providing a credential service related to a cloud service may be largely divided into a process in which the first cloud service providing system 10 authenticates a user and verifies authority and a process in which the first cloud service providing system 10 requests issuance of the credential for the second cloud service and transmits key information on the credential issued for the temporary account to the user (application).

Hereinafter, the process of user authentication and authority verification of the first cloud service providing system 10 that acts a request for issuing a credential will be described in detail.

When the first cloud service providing system 10 receives a request for issuing a credential temporary key for the second cloud service from the user terminal 30, the application requests the IDP module to issue an IDP token required to use the cloud API in the first cloud service providing system 10 (S501). The IDP token is a token issued by the IDP module to use the first cloud service providing system 10, and includes account information of a user who uses the API.

When the application receives the IDP token from the IDP module (S502), the application transmits, to a service console providing system, an API for requesting issuance of a credential temporary key to access the second cloud service (S503). In this case, the credential valid period information for the API call, which is input by the user, may be transmitted together with the API.

Afterwards, the service console providing system internally verifies authentication and authority of the user (S504), and requests the first system to issue the credential temporary key (S505). In this case, the service console providing system may request the first system to issue the credential temporary key while transmitting the IDP token issued by the IDP module to the first system. The first system 130 may be a key management service (hereinafter, referred to as 'KMS') system.

When the service console providing system internally succeeds in authenticating the user, the management module may log into an authentication module installed in an authentication engine through the IDP token that has succeeded in authentication.

Afterwards, the authentication module in the first system makes a verification request for the IDP token of the login information value requested to the IDP module (S506). In detail, the authentication module may perform authentication by using the IDP module and the logged-in authentication information. In this case, as a method of performing authentication, a JSON Web Token (JWT) authentication method may be adopted, but the present disclosure is not limited thereto. In the authentication process, a process of identifying whether a user has a permission to use a service provided by the first cloud service, including authentication with respect to the user, may be performed. For example, a process of identifying that a logged-in user has a permission to read a service providing the first cloud service but does not have a permission to correct the service may be performed.

When the authentication module in the first system successfully verifies the IDP token of the login information value, the IDP module identifies that the verification is successful in the authentication module in the first system and notifies the authentication module in the first system of the identified result (S507). Afterwards, the authentication module transmits authentication success information on the user to the management module.

Afterwards, the management module in the first system requests the IAM module to issue a temporary key to the second cloud service providing system 20-1 (S508). In this case, the policy and role of the second cloud service, which are registered in the IAM module, may be identified, and the first cloud service providing system 10 may request the second cloud service providing system 20-1 to issue credential key information based on the identified policy and role.

The authentication and authority of the user who has logged in to the first cloud service may be identified through the above procedure.

Hereinafter, the process in which the first cloud service providing system 10 requests issuance of the credential for the second cloud service and transmits key information on the issued credential to the user (application) will be described.

First, the authentication engine in the first system requests the second cloud service providing system 20-1 to issue an account. The second cloud service providing system 20-1 issues a temporary account to a first cloud service provider in response to the request for issuing an account. Afterwards, the authentication engine requests issuance of credential key information on the issued temporary account (S509). The credential key information on the temporary account may include information on an access key and a secret key, which may access the second cloud service providing system 20-2.

Figure 6:
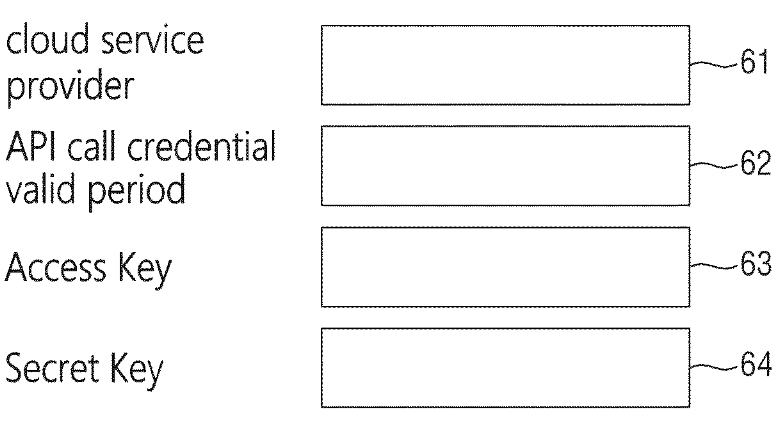
FIG. 6 is a view illustrating a temporary key issuance result guide message that may be displayed on a user terminal, in some embodiments of the present disclosure.

Afterwards, the second cloud service providing system 20-1 performs authentication and authority verification with respect to the first cloud service provider for the temporary account (S510). When the authentication and authorization verification are successfully performed, the second cloud service providing system 20-1 transmits the credential key information on the temporary account to the authentication engine (S511). FIG. 6 is a view illustrating a temporary key issuance result guide message that may be displayed on a user terminal. As shown in FIG. 6, the credential information on the temporary account includes a cloud service provider 61, such as AWS, Azure and GCP, an API call credential valid period 62, an access key 63 and a secret key 64. In this case, the access key and the secret key, which are included in the credential key information, are those for the temporary account issued by the second cloud service providing system 20-1 to the first cloud service provider, and it is obvious that the access key and the secret key are distinguished from the access key 402 and the secret key 403 of the account having the authority for the second cloud service providing system 20-1, which are created in advance by the user.

When the authentication engine 132 receives the credential key information on the temporary account, the first system transmits the credential key information to the application (S512).

As described above, the method for providing a credential service related to a cloud service has been described through the process in which the first cloud service providing system 10 authenticates the user and verifies the authority and the process in which the first cloud service providing system 10 requests issuance of the credential for the second cloud service and transmits key information on the credential issued for the temporary account to the user (application). In the present embodiment, the first cloud service providing system 10 requests to issue the credential for the second cloud service on behalf of the user, and only when the user needs to access the second cloud service, the first cloud service providing system 10 creates a temporary account and issues credential key information for the temporary account. Therefore, according to the present embodiment, since it is not necessary to hard-code the access key and the secret key for the account of the first cloud service in the source code or the configuration file, the credential key information may be prevented from leaking, and convenience in allowing the user to use the cloud service may be increased.

Hereinafter, some operations of the method for providing a credential service related to a cloud service will be described in detail with reference to FIGS. 7 and 8.

Figure 7:
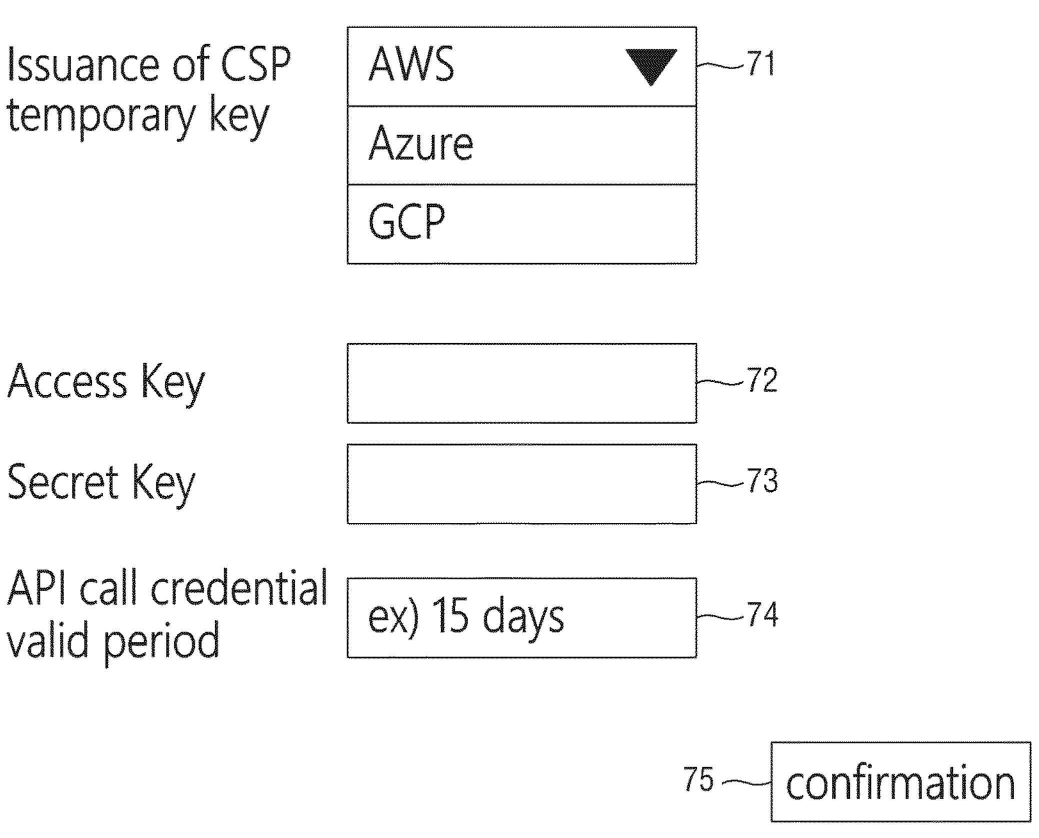
FIG. 7 is a view illustrating an exemplary temporary key issuance request page for a credential for calling an API, which may be displayed on a user terminal, in some embodiments of the present disclosure.
Figure 8:
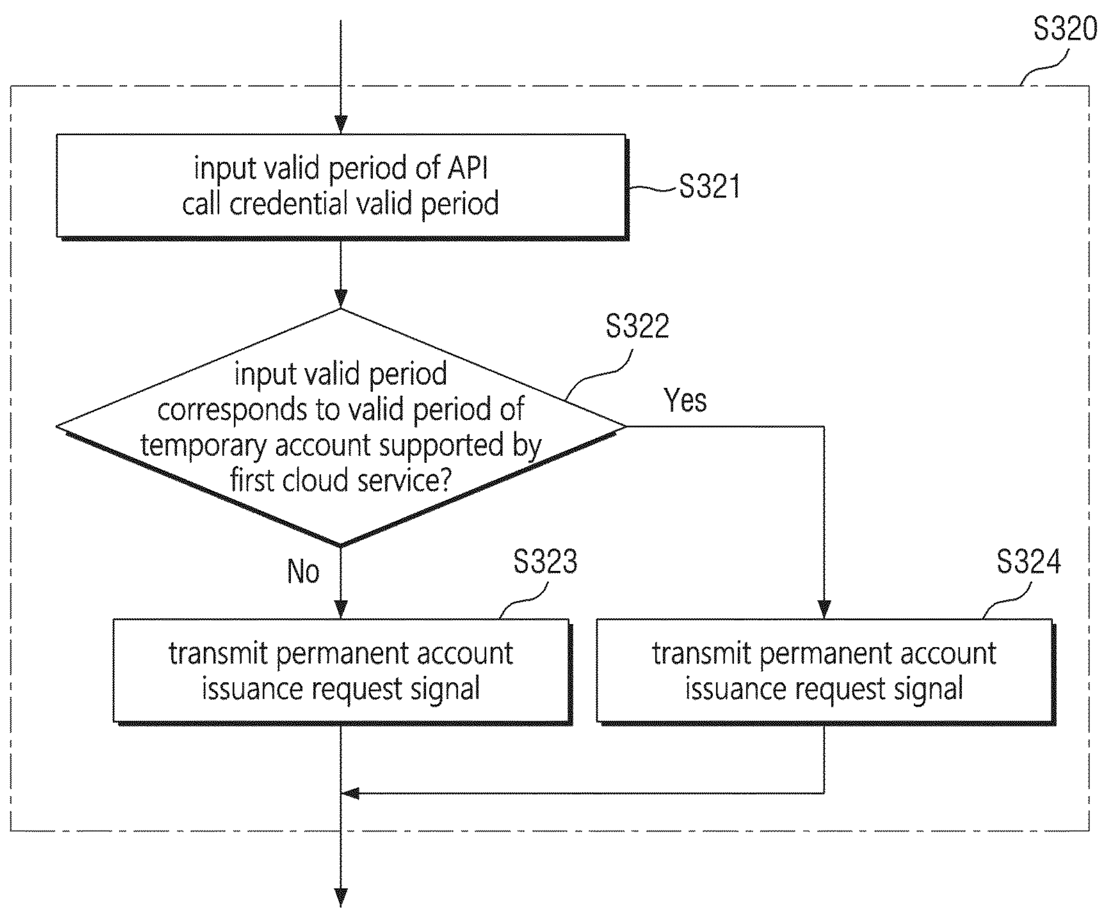
FIG. 8 is a detailed flow chart illustrating some operations of the method for providing a credential service related to a cloud service, which is described with reference to FIG. 3.

FIG. 7 is a view related to a request screen that may receive a credential valid period, and is a console screen displayed on the user terminal 30. Referring to FIG. 7, in the transmitted request page, the first cloud service providing system 10 may receive, from the user, a type 71 of the cloud service provider (CSP) (hereinafter referred to as 'CSP'), an access key 72, a secret key 73 and a credential valid period 74 for API call through the service console providing system 140.

An access key and a secret key of an account having an authority for the second cloud service providing system 20-1, which are created in advance by the user, are input to an area to which the access key 72 and the secret key 73 are input. In addition, the credential valid period 74 for API call may be set, so that the credential key information on the temporary account issued by the second cloud service to the first cloud service provider may be deleted when the valid period expires.

Hereinafter, a method for providing a credential service related to a cloud service according to one embodiment of the present disclosure will be described with reference to FIG. 8. FIG. 8 is a detailed flow chart illustrating some operations of the method for providing a credential service related to a cloud service, which is described with reference to FIG. 3.

In one embodiment, the first cloud service providing system 10 may receive the credential valid period 74 for API call from the user terminal 30 as shown in FIG. 7 (S321). The first cloud service providing system 10 may transmit a temporary account issuance request signal for requesting issuance of a valid temporary account for a period corresponding to the valid period of the credential for API call input to the second cloud service providing system 20-1.

"Corresponding" to the valid period of the credential for API call means that the valid period input by the user is completely the same as the valid period for the account that may be provided by the second cloud service providing system 20-2 or is different from that within a predetermined period. For example, when the valid period input by the user is '15 days', the first cloud service providing system 10 may transmit an account issuance request signal requesting issuance of a valid temporary account for a period of '15 days'.

In another embodiment, the first cloud service providing system 10 may receive the credential valid period for API call from the user terminal 30 as shown in FIG. 7 (S321). In this case, when the received valid period corresponds to the valid period of the temporary account supported by the second cloud service, the first cloud service providing system 10 may transmit a temporary account issuance request signal to the second cloud service providing system 20-1 in accordance with the input valid period (S324).

For example, when the valid period input by the user is '15 days' and the second cloud service providing system 20-1 may create a temporary account of '15 days', the first cloud service providing system 10 may transmit an account issuance request signal requesting issuance of a valid temporary account for the period of '15 days'. In this case, since the valid period desired by the user corresponds to a service period of the cloud service provided by the second cloud service providing system 20-1, the first cloud service providing system 10 does not need to transmit a separate deletion request for the temporary account to the second cloud service providing system 20-1.

In the present embodiment, the first cloud service providing system 10 issues a temporary account for the second cloud service and credential key information on the temporary account in accordance with the valid period input by the user. Therefore, according to the present embodiment, since the user does not need to separately create an account for the second cloud service, the user's usability of the cloud service is increased. In addition, since temporariness is given to the created account, it is not necessary to hard-code the access key and the secret key for the account of the first cloud service in the source code or the configuration file and thus the credential key information may be prevented from leaking. Since the use of the temporary account and the credential key information for the temporary account may be regulated for the other parties other than the cloud service user who is issued the temporary account and the credential key information, security of the cloud service may be enhanced.

In another embodiment, the first cloud service providing system 10 may receive the credential valid period for API call from the user terminal 30 as shown in FIG. 7 (S321). In this case, when the input valid period does not correspond to the valid period of the temporary account supported by the second cloud service, the first cloud service providing system 10 may transmit a permanent account issuance request signal to the second cloud service providing system 20-1 (S323).

For example, when the valid period input by the user is '18 months' and a maximum period at which the second cloud service providing system 20-1 may provide a temporary credential is '12 months', the first cloud service providing system 10 may transmit a permanent account issuance request signal to the second cloud service providing system 20-1. In this case, in order to prevent a situation in which the credential for the account are valid beyond the valid period input by the user, the first cloud service providing system 10 may transmit a deletion request signal for a created permanent account to the second cloud service providing system 20-1 when the valid period input by the user expires.

Even though the valid period input by the user does not correspond to the valid period of the temporary account supported by the second cloud service, the first cloud service providing system 10 may manage the account capable of accessing the second cloud service on behalf of the user in accordance with the valid period input by the user, thereby improving convenience and usability in using the cloud service by the user.

In another embodiment, the first cloud service providing system 10 may receive the valid period of the credential for API call from the user terminal 30. Therefore, the first cloud service providing system 10 may request the second cloud service providing system 20-1 to issue a permanent account. After the permanent account is issued, when the valid period of the credential for API call input by the user expires, the first cloud service providing system 10 may request the second cloud service providing system 20-1 to delete the created permanent account. In the present embodiment, the first cloud service providing system 10 may create a permanent account regardless of the valid period input by the user and delete the account after the valid period has elapsed. Therefore, according to the present embodiment, since the first cloud service providing system 10 may uniformly manage the account, convenience in account management may be increased.

Hereinafter, a method for providing a credential service related to a cloud service according to another embodiment will be described with reference to FIGS. 9 to 11.

Figure 9:
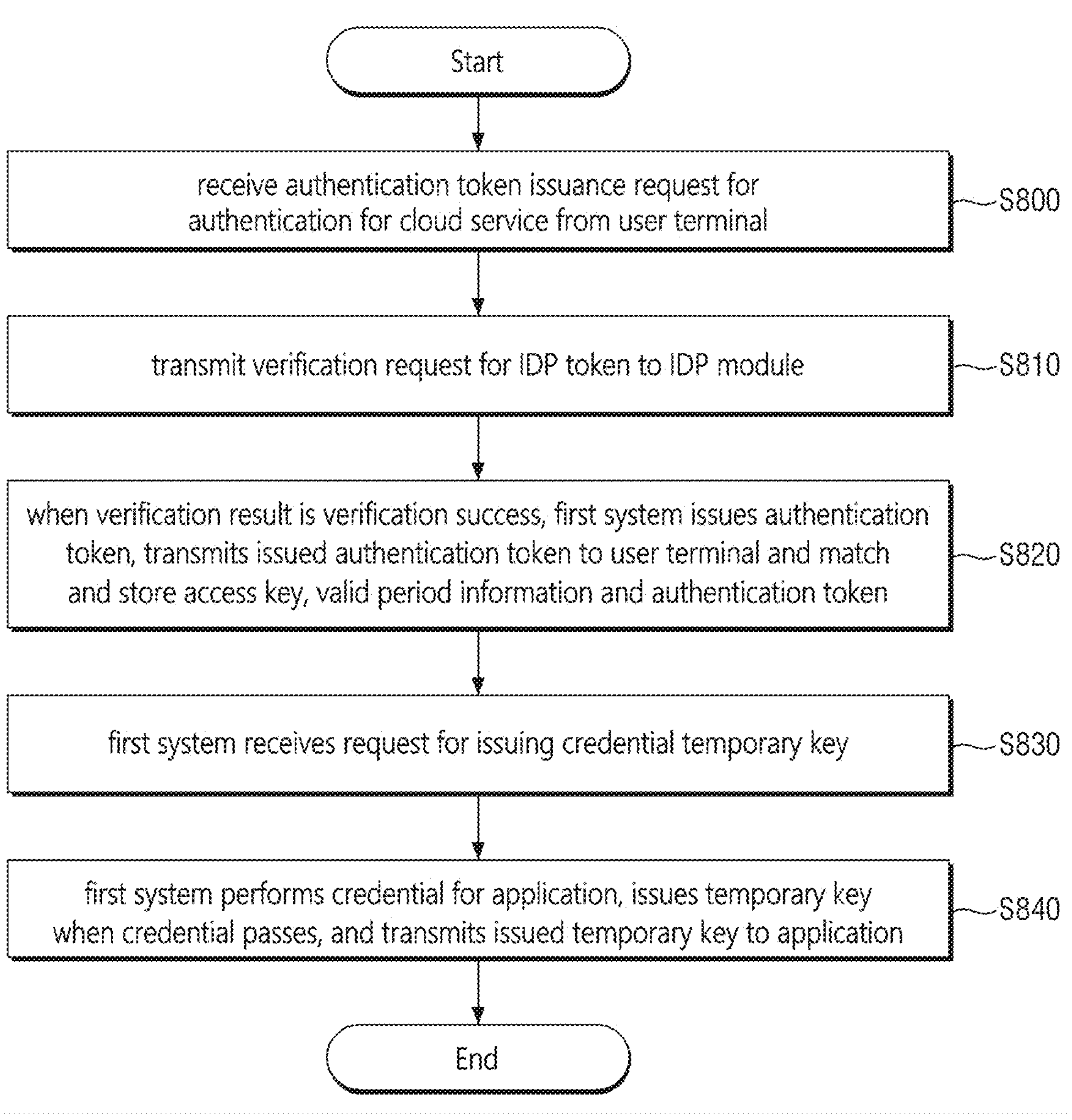
FIG. 9 is a flow chart illustrating a method for providing a credential service related to a cloud service according to another embodiment of the present disclosure.
Figure 10:
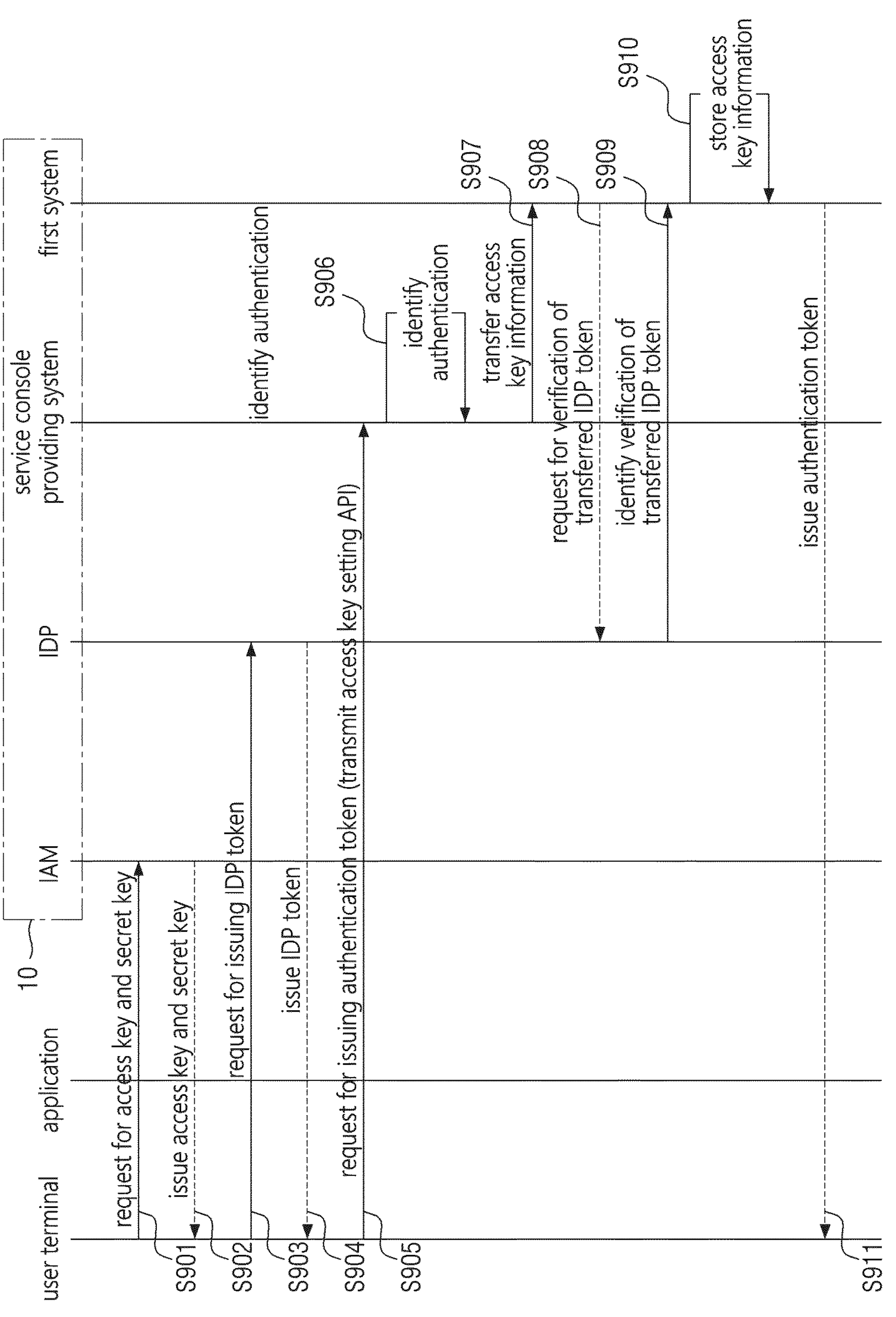
FIGS. 10 and 11 are signal flow charts illustrating the method for providing a credential service related to a cloud service, which is described with reference to FIG. 9.
Figure 11:
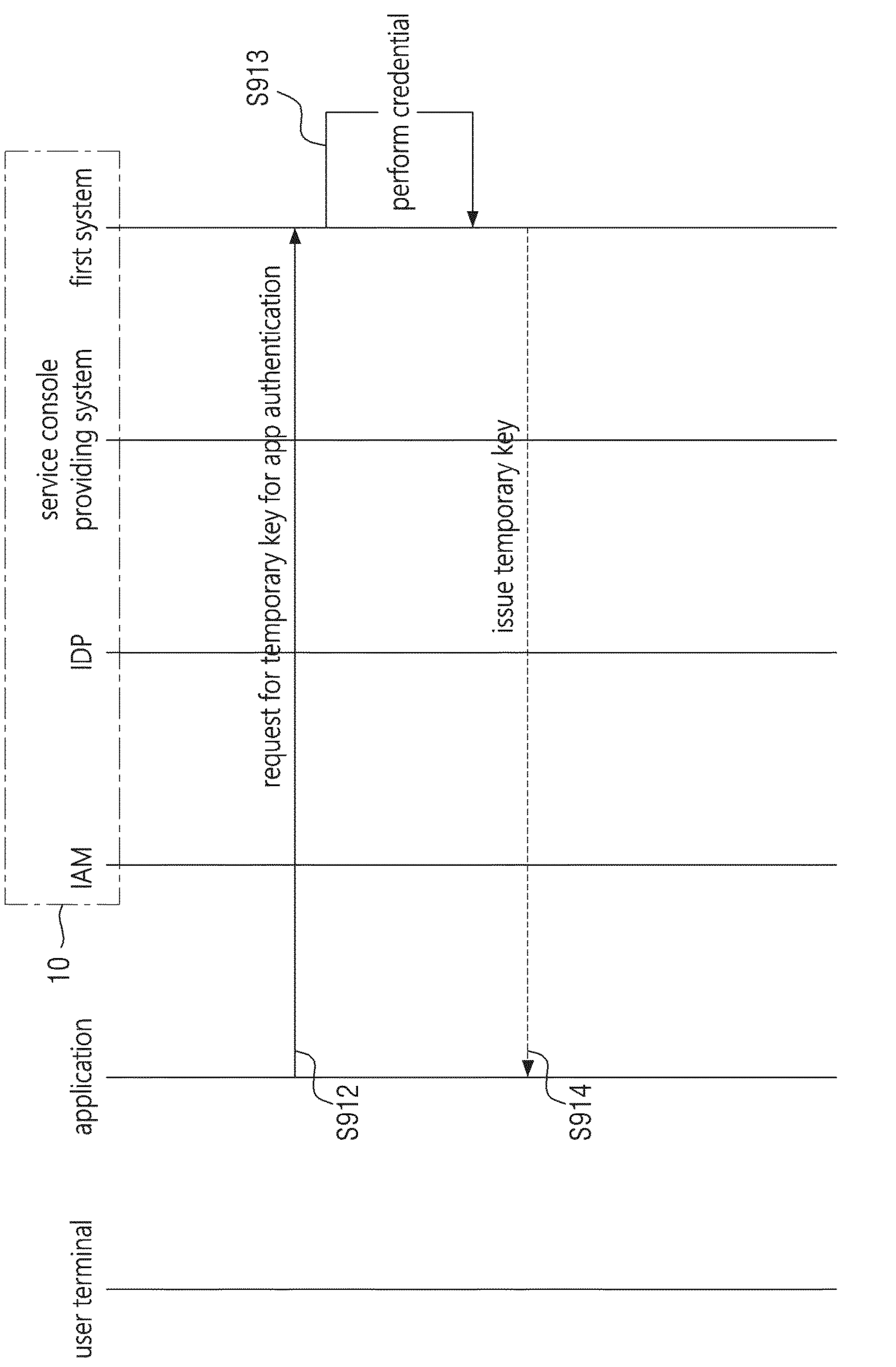

FIG. 9 is a flow chart illustrating a method for providing a credential service related to a cloud service, and FIGS. 10 and 11 are signal flow charts illustrating the method for providing a credential service related to a cloud service, which is described with reference to FIG. 9.

Since a configuration apparatus of the cloud service providing system is the same as the detailed configuration apparatus of the first cloud service providing system 10 shown in FIG. 2, a method for providing and using a temporary key for a credential in the cloud service providing system will be described with reference to the configuration apparatus shown in FIG. 2.

Referring to FIG. 9, in the service providing system according to the present embodiment, the first cloud service providing system 10 may receive an authentication token issuance request for authentication with respect to the cloud service from the user terminal (S800). In this case, the authentication token issuance request may include an access key issued by the IAM module 110, an IDP token issued by the IDP module 120 and valid period information of the temporary key. The access key is an access key of an account having the authority for the second cloud service providing system 20-1, which is created in advance by the user, and is distinguished from the temporary key.

Afterwards, the first system 130 in the first cloud service providing system 10 may transmit a verification request for the IDP token to the IDP module in response to the reception of the authentication token issuance request (S810).

Afterwards, the first system 130 receives the verification result for the IDP token from the IDP module, and when the verification result is a verification success, the first system 130 may issue an authentication token, transmit the issued authentication token to the user terminal and match and store the access key, the valid period information and the authentication token, which are included in the authentication token issuance request in a key storage space 132*b* therein (S820).

Next, the first system 130 may receive, from the application, a request for issuing a temporary key for credential for calling the cloud API (S830). In this case, the request for issuing the temporary key may include the authentication token issued by the first system 130. The temporary key may include an access key and a secret key, which may access the first cloud service during a valid period of the set temporary key.

Finally, the first system 130 may perform a credential for the application by using the authentication token included in the request for issuing the temporary key, issue a temporary key having a valid period according to the valid period information stored to correspond to the authentication token when the credential passes, and transmit the issued temporary key to the application (S840).

Hereinafter, the method for providing a credential service related to a cloud service according to the embodiment of FIG. 9 will be described with reference to FIGS. 10 and 11.

First, referring to FIG. 10, the IAM module receives a request for issuing an access key and a secret key, which may access the cloud service providing system, from the user terminal (S901). The access key and the secret key are required to authenticate that the user is a cloud service user, and after authenticating that the user is a cloud service user, an IDP token for API call and use may be issued.

When the IAM module issues the access key and the secret key to the user terminal (S902), the IDP module receives an IDP token issuance request from the user terminal (S903). The IDP token is required to use the API of the cloud service providing system, and includes account information of a user who uses the API.

When the IDP module issues the IDP token to the user terminal (S904), the service console providing system receives the authentication token issuance request from the user terminal (S905). The authentication token is a token for authentication regarding whether a user may use an application in a cloud service in the corresponding application. In this case, after authenticating the user's account information by using the issued IDP token (S906), the service console providing system may receive an access key setting API for a cloud service including access key information input from the user terminal, an application to be used and a credential valid period for API call.

Afterwards, when the service console providing system transfers the access key information input from the user terminal to the first system (S907), the management module in the first system may log in to the authentication module installed in the authentication engine through the IDP token that has succeeded in authentication. In this case, the first system 130 may be a KMS system.

Afterwards, the authentication module 132*a* requests verification of the IDP token transferred to the IDP module 120 (S908). In detail, the authentication module 132*a* may perform authentication by using the IDP module 120 and the logged-in authentication information. In this case, as a method of performing authentication, a JSON Web Token (JWT) authentication method may be adopted, but the present disclosure is not limited thereto.

When the IDP token transferred from the IDP module is successfully verified, the IDP module transmits verification success information to the authentication module of the first system (S909). Afterwards, the IDP module stores the access key information in a key storage space in the authentication engine (S910). Application information capable of using the corresponding access key and credential valid period information for API call may be stored together with the access key information. In addition, when the key storage space issues an authentication token including the access key information to the management module, the management module transfers the authentication token to the service console providing system, and the service console providing system finally issues the authentication token to the user terminal (S911).

In the present embodiment, the IAM module may issue the access key and the secret key, and the first system may separate the roles of the IAM module and the first system to transfer the access key information, perform verification for the transferred IDP token and store the access key information. Therefore, according to the present embodiment, the load on each module or system may be effectively reduced.

Hereinafter, referring to FIG. 11, a method for providing a temporary key for a credential in a cloud service providing system by an application after issuing an authentication token in the cloud service providing system will be described.

First, when the user terminal installs the issued authentication token in the application, the application requests the first system to issue a temporary key for a credential for calling the API served by the cloud service together with the issued authentication token (S912).

Afterwards, the first system performs a credential for the application by using the authentication token included in the request for issuing the temporary key (S913), and issues a temporary key having a valid period corresponding to credential valid period information for API call, which is stored in the authentication token when the credential passes, in accordance with the credential valid period information, and transmits the issued temporary key to the application (S914).

Afterwards, the user terminal may use the service provided by the cloud service within the valid period after user authentication through the temporary key. According to the present embodiment, as the valid period required for access to the cloud service may be set to issue the temporary key and allow access to the cloud service, it is not necessary to hard-code the access key and the secret key for the account of the cloud service in the source code or the configuration file, whereby the key information on the cloud service account may be prevented from leaking. In addition, the temporary key for the credential may be issued for only the user and the application, which are authenticated by the cloud service, so that the user and the application may use the temporary key, whereby stability in API call may be enhanced.

Figure 12:
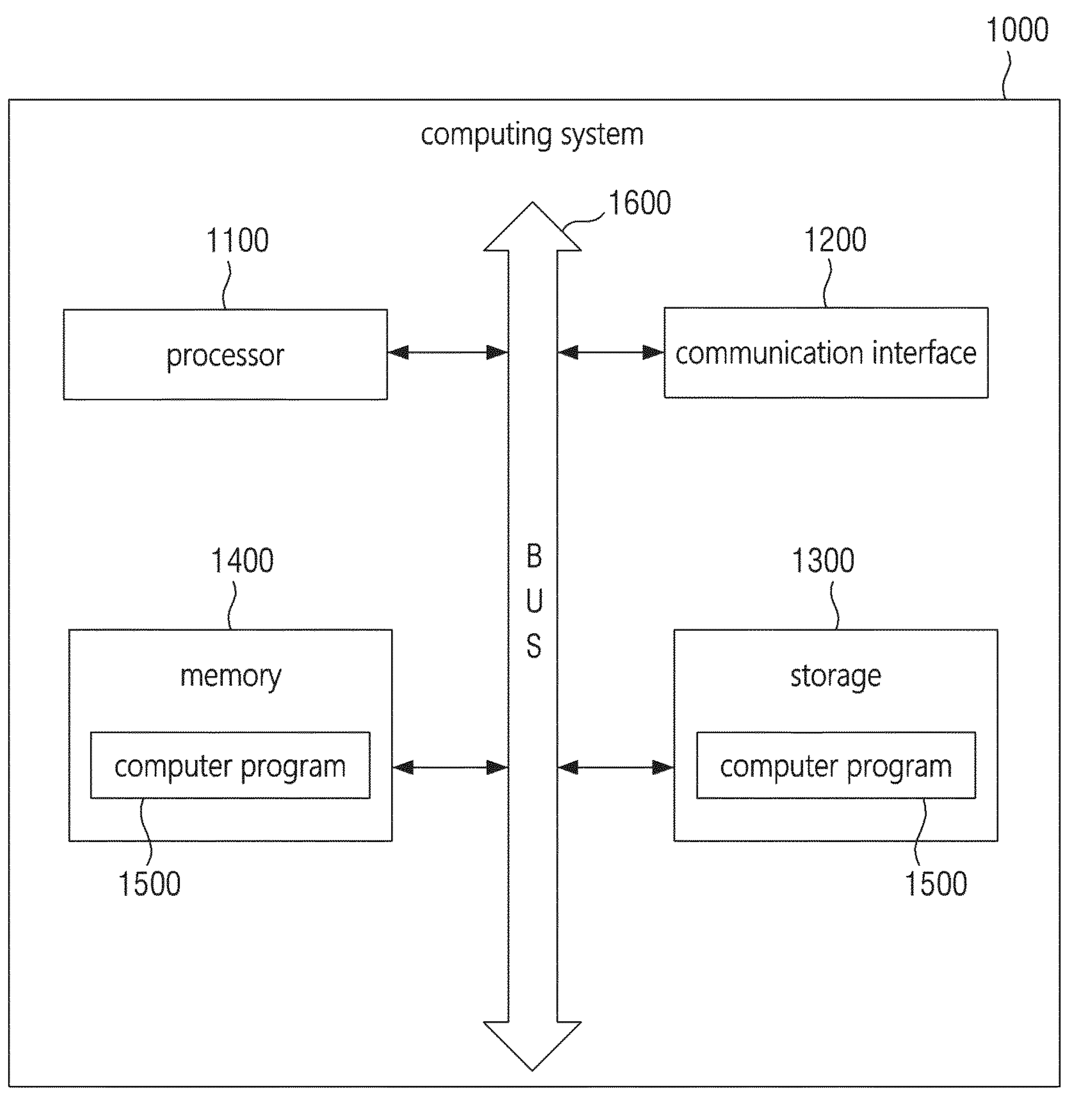
FIG. 12 is a view illustrating an exemplary computing system capable of implementing apparatuses according to various embodiments of the present disclosure.

FIG. 12 shows an exemplary computing system capable of implementing apparatuses according to various embodiments of the present disclosure. Hereinafter, an exemplary computing system capable of implementing an apparatus according to various embodiments of the present disclosure will be described with reference to FIG. 12.

FIG. 12 is a hardware schematic view illustrating a computing system 1000. As shown in FIG. 12, the computing system 1000 may include one or more processors 1100, a memory 1400 for loading a computer program 1500 executed by the processor 1100, a bus 1600, a communication interface 1200, and a storage 1300 for storing the computer program 1500. However, only components related to the present embodiment are shown in FIG. 12. Therefore, those skilled in the art to which the present disclosure pertains may note that other general-purpose components may be further included in the computing system 1000 in addition to the components shown in FIG. 12. The computing system 1000 of FIG. 12 may be the first cloud service providing system 10, the second cloud service providing system 20-1 or the third cloud service providing system 20-2 of FIG. 2.

The processor 1100 controls the overall operation of each component of the computing system 1000. The processor 1100 may include a Central Processing Unit (CPU), a Micro Processor Unit (MPU), a Micro Controller Unit (MCU), a Graphic Processing Unit (GPU) or any type of processor well known in the technical field of the present disclosure. In addition, the processor 1100 may perform computation for at least one application or program for executing the method/operation according to the embodiments of the present disclosure. The computing system 1000 may include one or more processors.

The memory 1400 stores various data, commands and/or information. The memory 1400 may load one or more programs 1500 from the storage 1300 to execute the method/operation according to various embodiments of the present disclosure. The memory 1400 may be implemented as a volatile memory such as RAM, but the technical scope of the present disclosure is not limited thereto.

The bus 1600 provides a communication function between the components of the computing system 1000. The bus 1600 may be implemented as various types of buses such as an address bus, a data bus and a control bus.

The communication interface 1200 supports wired/wireless Internet communication of the computing system 1000.

Also, the communication interface 1200 may support various communication methods other than Internet communication. To this end, the communication interface 1200 may include a communication module well known in the technical field of the present disclosure. In some cases, the communication interface 1200 may be omitted.

The storage 1300 may non-temporarily store the one or more computer programs 1500 and various types of data. The storage 1300 may include a non-volatile memory such as a flash memory, a hard disk, a detachable disk or any type of computer-readable recording medium well known in the art to which the present disclosure pertains.

The computer program 1500 may include one or more instructions that, when loaded into the memory 1400, cause the processor 1100 to perform the methods/operations according to various embodiments of the present disclosure. That is, the processor 1100 may perform the methods/operations according to various embodiments of the present disclosure by executing the one or more instructions.

For example, the computer program 1500 may include instructions for performing an operation of transmitting, to a user terminal, data of a request page including a cloud service selection field for selecting one cloud service from a list of a plurality of cloud services including a first cloud service and a second cloud service, an operation of receiving, from the user terminal, a request for issuing a temporary key for a credential for calling an API served by the first cloud service, an operation of transmitting an account issuance request signal to a system of the first cloud service in response to reception of the request for issuing the temporary key, an operation of receiving credential key information for a first account issued to an institution, which manages the computing system, from the system of the first cloud service in response to the transmission of the account issuance request signal, and an operation of transferring the credential key information to the user terminal in response to the request for issuing the temporary key.

So far, a variety of embodiments of the present disclosure and the effects according to embodiments thereof have been mentioned with reference to FIGS. 1 to 12. The effects according to the technical idea of the present disclosure are not limited to the forementioned effects, and other unmentioned effects may be clearly understood by those skilled in the art from the description of the specification.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

What is claimed is:

1. A method for providing a credential service related to a cloud service, performed by a computing system that provides a first cloud service, the method comprising:

transmitting, to a user terminal, data of a request page including a cloud service selection field for selecting one cloud service from a list of a plurality of cloud services, the plurality of cloud services including a second cloud service and a third cloud service, which are distinguishable from the first cloud service;

receiving, from the user terminal, a selection selecting the second cloud service;

receiving, from the user terminal, a request for issuing a temporary key for a credential for calling an application programming interface (API) served by the second cloud service selected in the cloud service selection field;

transmitting an account issuance request signal to a system of the second cloud service in response to the receiving the request for issuing the temporary key;

receiving credential key information for a first account issued to an institution, which manages the computing system, from the system of the second cloud service in response to the transmitting the account issuance request signal; and transmitting the credential key information to the user terminal in response to the request for issuing the temporary key.

2. The method of claim 1, wherein the request page further includes a field for receiving a valid period of the credential for the API call, and wherein the transmitting the account issuance request signal includes transmitting the account issuance request signal requesting an issuance of a temporary account valid for a period corresponding to the valid period of the credential for the API call.

3. The method of claim 2, wherein the transmitting the account issuance request signal requesting the issuance of the temporary account includes transmitting a temporary account issuance request signal based on the valid period input through the request page corresponding to a valid period of a temporary account supported by the second cloud service.

4. The method of claim 1, wherein the request page further includes a field for receiving a valid period of the credential for the API call, wherein the transmitting the account issuance request signal includes transmitting a permanent account issuance request signal in response to determining that the valid period of the credential for the API call does not corresponding to the valid period of a temporary account supported by the second cloud service, and wherein the method further comprises transmitting an account deletion request signal to the system of the second cloud service based on an expiration of the valid period of the credential for the API call.

5. The method of claim 1, wherein the request page further includes a field for receiving a valid period of the credential for the API call, wherein the transmitting the account issuance request signal includes transmitting a permanent account issuance request signal, and wherein the method further comprises transmitting an account deletion request signal to the system of the second cloud service based on an expiration of the valid period of the credential for the API call.

6. A system for providing a credential service related to a cloud service, the system being configured to provide a first cloud service and comprising:

one or more processors; and a memory configured to store instructions, wherein the one or more processors are configured to execute the instructions to perform:

transmitting, to a user terminal, data of a request page including a cloud service selection field for selecting one cloud service from a list of a plurality of cloud services, the plurality of cloud services including a second cloud service and a third cloud service, which are distinguishable from the first cloud service;

receiving, from the user terminal, a selection selecting the second cloud service;

receiving, from the user terminal, a request for issuing a temporary key for a credential for calling an application programming interface (API) served by the second cloud service selected in the cloud service selection field;

transmitting an account issuance request signal to a system of the second cloud service in response to the receiving the request for issuing the temporary key;

receiving credential key information for a first account issued to an institution, which manages the system, from the system of the second cloud service in response to the transmitting the account issuance request signal; and transmitting the credential key information to the user terminal in response to the request for issuing the temporary key.

7. The system of claim 6, wherein the request page further includes a field for receiving a valid period of the credential for the API call, and wherein the transmitting the account issuance request signal includes transmitting the account issuance request signal requesting an issuance of a temporary account valid for a period corresponding to the valid period of the credential for the API call.

8. The system of claim 7, wherein the transmitting the account issuance request signal requesting the issuance of the temporary account includes transmitting a temporary account issuance request signal based on the valid period input through the request page corresponding to a valid period of a temporary account supported by the second cloud service.

9. The system of claim 6, wherein the request page further includes a field for receiving a valid period of the credential for the API call, wherein the transmitting the account issuance request signal includes transmitting a permanent account issuance request signal in response to determining that the valid period of the credential for the API call not corresponding to a valid period of a temporary account supported by the second cloud service, and wherein the one or more processors are configured to execute the instructions to further perform transmitting an account deletion request signal to the system of the second cloud service based on an expiration of the valid period of the credential for the API call.

10. The system of claim 6, wherein the request page further includes a field for receiving a valid period of the credential for the API call, wherein the transmitting the account issuance request signal includes transmitting a permanent account issuance request signal, and wherein the one or more processors are configured to execute the instructions to further perform transmitting an account deletion request signal to the system of the second cloud service based on an expiration of the valid period of the credential for the API call.

* * * * *